2,940,910

PROCESS FOR PRODUCING AN AQUEOUS LIQUID-CONTAINING YEAST PREPARATION

Heinrich Metz, 61 Auf der Egge, Grossdornberg uber Bielefeld 2, Germany

No Drawing. Filed May 7, 1956, Ser. No. 582,953

2 Claims. (Cl. 195—97)

This invention relates to a process for producing an aqueous liquid-containing yeast preparation containing living yeast cells and is a continuation-in-part of the application filed by me on February 6, 1952, Serial No. 270,280, now abandoned, and embodies improvements in the art thereover.

The high biological-physiological value of beer yeast cells is well known in the art. However, in spite of the presence of numerous yeast products of various kinds for alimentary and medical purposes, the yeast cells have not gained due importance owing to the fact that the yeast during its processing and storage underwent considerable biological changes.

The hitherto known methods for producing yeast preparations were based on dry yeast. However, such preparations are open to the objection that they merely contain dead and, thus, inactive yeast cells.

The present invention sets out to produce a yeast preparation the yeast cells of which are kept viable and capable to germinate over an extended period of time, that is several months; the living yeast cells therein being so stable that their biological and physiological efficiency will not be impaired when the preparation is heated up to near the boiling point for a short time for the purpose of killing germs or microbes.

The invention has for its object to provide a process for producing a stable aqueous liquid-containing preparation containing living beer yeast cells which are aqueous and non-plasmolyzing even when heated for a short time up to slightly below the boiling point of the liquid, comprising the steps of forming an intimate mixture consisting essentially of living beer yeast cells from low fermentation yeast and a liquid containing at least one acidic substance selected from the group consisting of ascorbic acid and lactic acid, said liquid also containing a fermentable sugar selected from the group of fruit and milk sugars, said liquid being added in amount sufficient to impart a pH of from 4.0 to 5.8 to the mixture, applying heat at least at this stage of the process, keeping the mixture at a temperature of from 40 to 64° C. for a predetermined period of time, and cooling said mixture down to a temperature not below the freezing point of said mixture.

In order to bringing the mixture to the temperature at which it is to be kept after the mixing operation for a predetermined period of time, it is possible either to heat the liquid to be added prior to the mixing operation, or to heat the mixture, i.e. the yeast cells and the liquid, up to the temperature desired.

While the mixture is kept at this temperature, parts of the added acid will decompose so that free H-ions form which are bound by the material of the surface of the living yeast cells in such a manner that hydrogen compounds are deposited on and around each living yeast cell. The fermentable fruit or milk sugar which has entered the yeast cells during their being mixed with the liquid, will be fermented under the influence of the applied heat so that besides carbonic acid, alcohol, glycerin and some glycogen, nutritive substances are formed which serve for nourishing the yeast cells and building up fresh yeast cells. These nutritive substances in the yeast cells, which are produced by the fermentation process, keep the yeast cells viable and capable to germinate over an extended period of time, that is several months.

The gaseous H-ions deposited on and around each yeast cell form a protective cover which, on the one hand, prevents heat from being transmitted too rapidly into the cell when heating the mixture for a short period of time up to a maximum temperature of about 90 to 93° C. for the purpose of killing germs or microbes and, on the other hand, prevents detrimental matter from entering the cell.

The temperature at which the mixture is to be kept after the mixing operation must be maintained only as long as the gaseous H-ions deposited on and around each living yeast cell do not escape, i.e. vaporize, and the liquid in the mixture has not essentially vaporized either. Practical experience has shown that about an hour will suffice for fermenting the sugar and forming H-ions from the acid contained in the liquid. After this has been effected, the fermentation process must be discontinued by cooling down the mixture to a temperature which is still above the freezing point and which preferably is in the vicinity of 15–20° C.

A particularly long life and an extended germinating capability of the aqueous yeast cells can be attained if the mixture, after it has cooled down, is subjected to a treatment with carbon dioxide. Carbon dioxide prevents harmful matter, such as oxygen, from entering the mixture, which may otherwise lead to detrimental oxidation of the living yeast cells.

As liquids which contain both ascorbic acid and fruit sugar, juices of citric fruits are preferably used. A suitable liquid containing lactic acid is whey. The ascorbic acid or lactic acid present in such organic liquids is, upon heating of the liquids, in a high degree capable of setting free H-ions which deposit on the living yeast cells. The fruit sugar or milk sugar contained in said juices or whey, respectively, ferments easily and forms nutritive substances in a quantity sufficient for keeping the yeast cells alive and building up over an extended period of time.

Ascorbic acid or lactic acid, respectively, is particularly suitable and valuable for the purpose required, because, apart from being capable of setting free H-ions, it will neither attack the living yeast cells nor destroy their walls.

A yeast which is preferably suitable for producing the aqueous liquid-containing yeast preparation of the present invention is a purified yeast freed from bitterness, which is known under the scientific name of "*Saccharomyces cerevisiae*." This refers to a low-fermentation beer yeast which is viable and capable to germinate.

A satisfactory preservation of the living yeast cells stabilized by such organic liquids as citric fruit juices or whey containing ascorbic acid or lactic acid, respectively, can be obtained in that the mixture, after having cooled down, is filled into a container which, preferably under elevated pressure, is then filled with carbon dioxide. Consequently, the living yeast cells will be enclosed by a protective cover of gas, or the yeast cells floating in the acid liquid will be covered up by the carbon dioxide, so that oxygen or other harmful matter are kept off the preparation. After a certain time has passed, the yeast cells will settle down on the bottom of the container while the acid liquid collects above the yeast cells. This phenomenon, which only occurs in the case of living yeast cells, shows that the preparation does not contain any important quantity of plasmolyzing cells.

In order to retain the viability of the yeast cells as well as their capability to germinate, it is necessary to maintain a certain pH during the mixing operation and during the entire time the mixed preparation is kept under carbon dioxide. This pH is suitably in the vicinity of 4.0 to 5.8, preferably between 4.5 and 5.3. The pH is preferably kept within these limits by the addition of water if the acidity rises beyond the values desired.

The invention will be more particularly illustrated by the following examples. These examples are embodiments of the invention and are not to be construed in limitation thereon.

Example 1

50 kgs. of purified low-fermentation beer yeast having a temperature of about 20° C. are mixed with 11 kgs. of citrus fruit juice of a temperature of about 18° C., said mixture being stirred intensely so as to obtain an intimate mingling of the two components. The mixture is then heated up to a temperature of about 60 to 64° C. and kept at this temperature for an hour or so. Due to this the ascorbic acid contained in the citrus fruit juice releases H-ions which deposit on and enclose each individual yeast cell. At the same time the fruit sugar contained in the citrus fruit juice having entered the cells is not only fermented to alcohol and carbonic acid but also a nutritive substance produced, which substance serves for keeping alive the yeast cells already present as well as for building up fresh cells. Continuous stirring of the mixture during this time will remove the alcohol formed therein since it is superfluous and of no use. After one hour of heating when most of the sugar has been fermented and a sufficient quantity of gaseous H-ions has deposited on and around the individual yeast cells, the mixture is cooled down to a temperature of about 20° to 15° C. and thus the fermentation process interrupted. The mixture is then filled into a storage container and, under pressure, subjected to carbon dioxide which may be added in a warm state. After the carbon dioxide has cooled down a slight vacuum exists in the container through the medium of which the container can be air-tightly closed by means of a cover.

The preparation produced in the manner described will remain fresh and viable for six to eight months or even longer.

Example 2

11 kgs. of citrus fruit juice or whey, respectively, are heated up to a temperature of about 60° C. and then mixed with 50 kgs. of living low-fermentation beer yeast cells so that, while stirring and applying heat thereto, an intimate mixture having a temperature of about 50 to 55° C. is obtained. The mixture is kept at this temperature for about 1½ hours until the fruit sugar or the lactic sugar, respectively, has been transformed to alcohol, carbonic acid and some valuable nutritive substances. During this time the ascorbic acid or lactic acid, respectively, has released gaseous H-ions which have deposited on and around each individual living yeast cell so as to form a protective cover of gas. At the end of this heating period when the fruit sugar or the lactic sugar, respectively, has been fermented to a sufficient extent and unfermentable nutritive substances have formed in the individual living yeast cells, the mixture is cooled down to about 20° C. The mixture can then, as stated in connection with Example 1, be subjected to carbon dioxide applied under pressure which, for example, is between 0.2 and 0.4 atmosphere. The preparation in the then sealed container consists of a lower layer of living yeast cells capable to germinate and an upper layer of a clear aqueous liquid containing ascorbic acid or lactic acid, respectively, the remaining space above the preparation being filled with carbon dioxide.

The mixing of the yeast cells with citrus fruit juice or whey, respectively, and the heating of the mixture, as described in the two examples given above takes place in an open vessel. Care must be taken so as to avoid the occurrence of gas pressures which may result in a bursting of the living yeast cells.

An additional advantage of the yeast preparation produced according to the process and with the ingredients described above resides in the fact that the yeast cells are enriched with vitamin C.

Sea-buckthorn juice, too, has proved an especially valuable ascorbic acid carrier. In using sea-buckthorn juice it is of special advantage that this additionally provides a kind of provitamin of vitamin A, viz. zeaxantene. Alternately, provitamin A may be added, for example, in the form of biologically pure carotene being obtained from natural carotene carriers. By the admixture of provitamin A, i.e. carotene, an essential increase in the value of the yeast preparation according to the invention is achieved.

For the purpose of killing germs or microbes the preparation may finally, for a short period of time, be subjected to a maximum temperature of 93° C., which is essentially higher than the mixing temperature of the preparation, without killing the living cells by bursting or plasmolyzing. This heating, however, must take place in an open vessel as otherwise the yeast cells will burst.

I claim:

1. A process for producing a stable aqueous liquid-containing preparation containing living beer yeast cells which are aqueous and non-plasmolyzing even when heated for a short time up to slightly below the boiling point of the liquid, comprising the steps of forming an intimate mixture consisting essentially of living beer yeast cells from low-fermentation yeast and a naturally occurring liquid containing at least one naturally present acidic substance selected from the group consisting of ascorbic acid and lactic acid, said liquid also containing naturally present fermentable sugar selected from the group of fruit and milk sugars, said liquid being heated up to a temperature of from 60 to 70° C. prior to the mixing and then added in amount sufficient to impart a pH of from 4.0 to 5.8 to the mixture, keeping said mixture at a temperature of about 60° C. for a predetermined period of time, cooling said mixture down to a temperature of about 20° C., and thereafter treating it with carbon dioxide applied under slight overpressure.

2. A process for producing a stable aqueous liquid-containing preparation containing living beer yeast cells which are aqueous and non-plasmolyzing even when heated for a short time up to slightly below the boiling point of the liquid, comprising the steps of forming an intimate mixture at a temperature of from about 15 to 20° C., said mixture consisting essentially of living beer yeast cells from low-fermentation yeast and a naturally occurring liquid containing at least one naturally present acidic substance selected from the group consisting of ascorbic acid and lactic acid, said liquid also containing naturally present fermentable sugar selected from the group of fruit and milk sugars, said liquid being added in amount sufficient to impart a pH of from 4.0 to 5.8 to the mixture, applying heat at least at this stage of the process, keeping said mixture at a temperature of about 60° C. for a period of from ½ to 2 hours, cooling said mixture down to a temperature of about 15° C., and consecutively filling the mixture into containers and treating it with carbon dioxide applied under slight overpressure.

References Cited in the file of this patent

UNITED STATES PATENTS

| | | |
|---|---|---|
| 92,376 | Shaw | July 6, 1869 |
| 1,606,512 | Caspar | Nov. 9, 1926 |
| 1,625,121 | Hildebrandt | Apr. 19, 1927 |
| 1,633,711 | Prince | June 28, 1927 |
| 1,706,566 | Dawson | Mar. 26, 1929 |
| 1,970,306 | Hanack et al. | Aug. 14, 1934 |
| 2,072,748 | Fuchs | Mar. 2, 1937 |

FOREIGN PATENTS

| | | |
|---|---|---|
| 23,224 of 1893 | Great Britain | Dec. 2, 1893 |
| 10,061 of 1900 | Great Britain | Aug. 4, 1900 |